United States Patent
Millefiorini et al.

(10) Patent No.: US 10,140,294 B2
(45) Date of Patent: Nov. 27, 2018

(54) DOCUMENT MANAGEMENT SYSTEMS AND METHODS

(75) Inventors: Marco Millefiorini, Latina (IT); Carlo Bucciarelli, Rome (IT); Riccardo Chittolini, Saronno-Varese (IT); Alessandra Iacovelli, Milan (IT); Ciro Rinaldi, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 823 days.

(21) Appl. No.: 13/485,367

(22) Filed: May 31, 2012

(65) Prior Publication Data

US 2013/0246914 A1    Sep. 19, 2013

(30) Foreign Application Priority Data

Mar. 15, 2012  (EP) .................................. 12425054

(51) Int. Cl.
*G06F 17/30* (2006.01)
*G06Q 10/10* (2012.01)

(52) U.S. Cl.
CPC ....... *G06F 17/30011* (2013.01); *G06Q 10/10* (2013.01); *G06Q 2220/00* (2013.01)

(58) Field of Classification Search
CPC .... G06F 17/24; G06F 17/25; G06F 17/30011; G06T 11/60; A63F 2300/5553; A63F 2300/6623; G06Q 10/10; G06Q 2220/00
(Continued)

(56) References Cited

U.S. PATENT DOCUMENTS

2005/0234851 A1    1/2005  King et al.
2005/0289182 A1*  12/2005  Pandian ............. G06K 9/00442
(Continued)

FOREIGN PATENT DOCUMENTS

CA      2 583 766       9/2008
WO    WO 99/59083    11/1999

OTHER PUBLICATIONS

EP Extended Search Report for related application EP 12425054.9, dated Jul. 5, 2012 (8 pages).

*Primary Examiner* — Andrew R Dyer
*Assistant Examiner* — Jenq-Kang Chu
(74) *Attorney, Agent, or Firm* — Mannava & Kang, P.C.

(57) ABSTRACT

Disclosed are a data management system and computer-readable medium encoded with instructions to execute a method including communicating, by one or more of a document management application supporting integration protocols and a document management module in communication with the document management application, with one or more of a user relationship management system and a document management system using the one or more integration protocols; receiving a request to execute the document management application comprising a previously-created document management process; displaying an indication of a set of documents to be acquired; communicating with a signature acquisition module using the integration protocols configured to acquire a digital signature from a signature input device to create a digitally-signed electronic document; receiving the digitally-signed electronic document; creating an association in the form of a transaction file between user identification information and the digitally-signed electronic document; and transmitting the transaction file to be stored.

14 Claims, 12 Drawing Sheets

(58) Field of Classification Search
USPC .................................. 715/201, 202, 230, 255
See application file for complete search history.

(56) References Cited

U.S. PATENT DOCUMENTS

| | | | |
|---|---|---|---|
| 2007/0094510 A1* | 4/2007 | Ross | G06Q 20/02 713/178 |
| 2008/0147790 A1 | 6/2008 | Malaney et al. | |
| 2010/0114772 A1* | 5/2010 | Gustin | G06Q 20/10 705/43 |
| 2010/0158326 A1* | 6/2010 | Takeda | G06K 9/00154 382/119 |

* cited by examiner

DOCUMENT MANAGEMENT SYSTEMS AND METHODS

CROSS-REFERENCE TO RELATED APPLICATION

This application claims the benefit of priority to European Patent Application No. EP 12425054.9, filed Mar. 15, 2012, which is hereby incorporated by reference in its entirety.

BACKGROUND

Presently, a variety of businesses and industries require document management processes in which numerous documents are acquired and compiled. In order to obtain the correct documentation in accordance with a particular document management process, administrators need to be able to prepare and modify document management processes suited for their specific business or industry which are able to be presented to operators facilitating the document acquisition from customers in order to guide the operators in the document acquisition process. However, electronic document acquisition may require accessing numerous platforms and systems in order to obtain and store the documents.

Some transactions, such as mortgage applications, etc. require physical documentation in order to provide proof that the document at issue, such as a signed contract, is the original document. However, a problem exists in that paper files cannot be easily stored. Even if the paper files are electronically stored, it is difficult to ascertain which of the electronic documents is an original document.

Further, some electronic document management acquisition systems obtain all of the documentation at a network node instead of at a host computer in communication with the network node, thereby requiring a large amount of storage capacity at the network node.

In addition, electronic document acquisition processes typically link acquired documents only to customer data and not to the single transaction as, for example, a transaction file. Therefore, users are not able to directly retrieve only the documents that relate to the single transaction.

Therefore, a need exists for a document management tool that can integrate with numerous platforms and systems, which is easy to use and designed for the flexible creation of document management processes that allow administrators to create document management processes for their particular industry or business. A need also exists for a document management tool that avoids the problem of having to store original documents, such as original signed documents. A need further exists for a document management tool in which a document acquisition process may occur either primarily at individual host computers or at the network node in communication with the host computers. A need additionally exists for a document management tool that links acquired documents to customer data for a particular transaction. The above-described needs and others not explicitly stated are attempted to be addressed by the present disclosure.

OVERVIEW

A technical advantage of the present disclosure is providing a document management tool that performs the processing of documents, images, data from documents, etc. to form a specific file at a client device, resulting in a reduction in required storage capacity at the network level. Another technical advantage of the present disclosure is that, because a single transaction file is created for each transaction, including each of the documents required for the single transaction, instead of a general user file containing documents related to numerous transactions, a user is able to easily access and monitor the status of the individual transaction file, for example, a mortgage application. An additional technical advantage of the present disclosure is that a single tool is provided that integrates with numerous systems at the front end and the back end to acquire documents from a variety of sources, thereby providing a more efficient document management acquisition and compilation system.

Another technical advantage is that, because the document management tool integrates with a signature acquisition tool and a digital signature is obtained to create an electronically-signed digital document that is stored in a transaction file, an originally-signed document is identified for the particular transaction.

A further technical advantage is that the present disclosure provides for faster document processing by comparing images of documents with templates created to identify particular types of documents.

An additional technical advantage of the present disclosure is being able to provide a document management application to a variety of client devices quickly by installing the document management application from a portable storage device onto the client devices using a different operating system, via a virtualization tool.

In accordance with at least one example, a computer-readable medium encoded with instructions which, when executed by a processor, cause the processor to execute a method, is provided. The method includes communicating, by one or more of a document management application supporting one or more integration protocols and a document management module in communication with the document management application, with one or more of a user relationship management system and a document management system using the one or more integration protocols. The method also includes receiving a request at one of a document management application and a document management module from the user relationship management system to execute the document management application comprising a previously-created document management process and implement the previously-created document management process. The method further includes displaying, on a graphical user interface at a host computer, an indication of a set of documents to be acquired from a plurality of documents identified in the previously-created document management process, the set of documents comprising at least one document comprising a digital signature. The method additionally includes communicating, by one or more of the document management application supporting one or more integration protocols and the document management module in communication with the document management application, with a signature acquisition module using the one or more integration protocols configured to acquire a digital signature from a signature input device to create a digitally-signed electronic document. The method also includes receiving the digitally-signed electronic document created with the digital signature from the signature acquisition module; creating an association in the form of a transaction file between user identification information and the digitally-signed electronic document; and transmitting the transaction file to be stored in a database.

In accordance with at least one example, a document management system is provided. The document management system includes a network node, a host computer, a database, and an input device. The host computer communicates with the network node and includes a graphical user interface configured to display an indication of a set of documents to be acquired from a plurality of documents identified in a previously-created document management process, the set of documents comprising at least one document comprising a digital signature. The database is in communication with the host computer. The input device is configured to receive a user signature used to create a digitally-signed electronic document. A document management application supporting one or more integration protocols is executed at one or more of the host computer and the network node. The document management application comprising the previously-created document management process. Execution of the document management application causes the indication of the set of documents to be acquired according to the previously-created document management process to be displayed at the graphical user interface at the host computer. One or more of the document management application and a document management module in communication with the document management application is configured to communicate with a signature acquisition module using the one or more integration protocols to acquire a digital signature from the input device, create a digitally-signed electronic document with the digital signature and receive the digitally-signed electronic document, create an association in the form of a transaction file between user identification information and the digitally-signed electronic document, and transmit the transaction file to the database to be stored therein.

DETAILED DESCRIPTION

Figure 1:
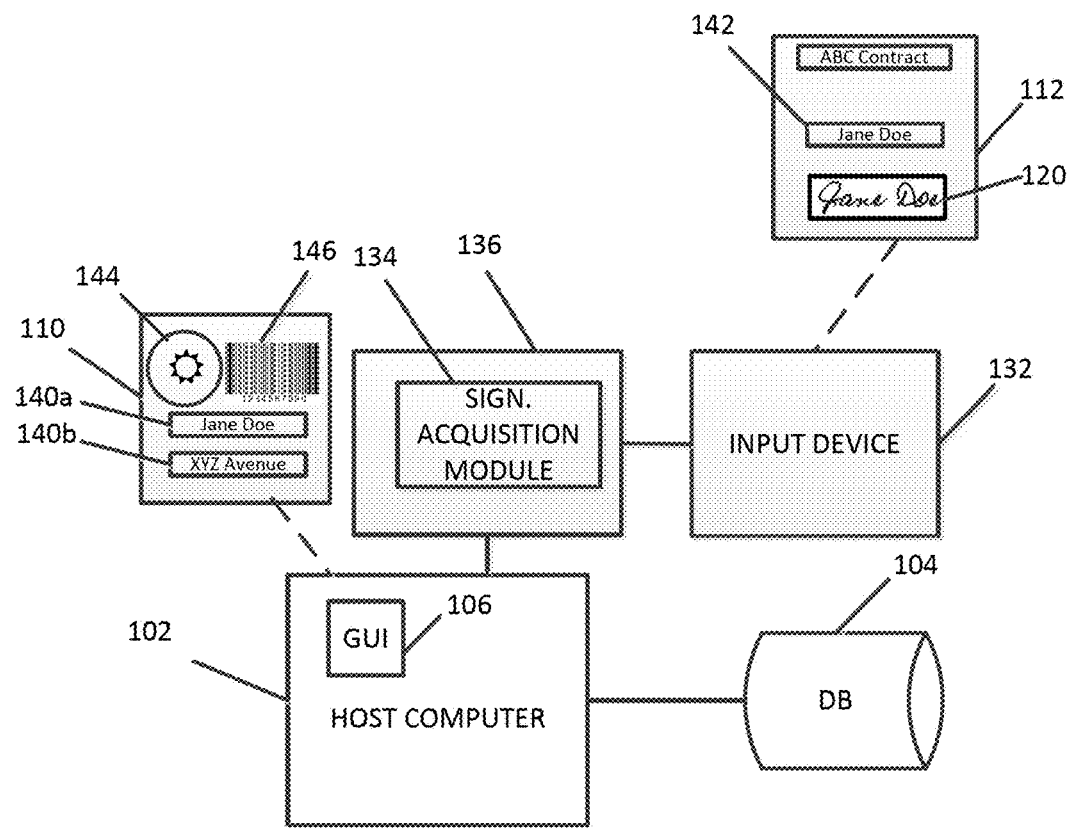
FIG. 1 includes a schematic diagram of an exemplary embodiment of the present teachings.

FIG. 1 is a schematic diagram illustrating an exemplary document management system 100 comprising host computer 102 in communication with database 104. The host computer 102 comprises graphical user interface (GUI) 106. Documents, such as document 110 and document 112, may be displayed at GUI 106. Host computer 102 communicates with signature acquisition module 134. Signature acquisition module 134 communicates with signature input device 132 to request and obtain a user signature at signature input device 132. Signature acquisition module 134 may be provided separately from signature input device 132 at processing device 136 or may be provided and executed at signature input device 132.

Signature input device 132 may be any device configured to receive user input from a user, for example, a signature of a user. Signature input device 132 may be any device providing input and operation capabilities, for example, a tablet computer having input and operation capabilities through a display, such as a touchscreen, which receives input either directly from physical user touch or from stimulus through, for example, a stylus. Signature input device 132 may receive the user input, such as a signature, at signature input device 132, or may display a document, such as an electronic document, at input device 132 and receive input from a user, such as a signature, on the displayed electronic document, to form digitally-signed electronic document 112 comprising digital signature 120. When signature acquisition module 134 is provided and executed separately from signature input device 132 at, for example, processing device 136, signature input device 132 may receive the user input, such as a signature, at signature input device 132 and transmit a digital form of the signature to form digitally-signed electronic document 112 comprising digital signature 120. One of ordinary skill in the art would recognize that, although a signature is described, any of a variety of input indications from a user may be received at signature input device 132 that indicates that a user has provided proof of identity and intent with respect to the electronic document, such as, for example, user initials or any other indicative mark. Digitally-signed electronic document 112 may also include user identification information at, for example, field 142, such as a customer name.

Host computer 102 communicates with signature acquisition module 134 to acquire a signature from signature input device 132. As will be discussed in more detail below, a document management application (see FIGS. 4A-4B) supporting one or more integration protocols communicates with signature acquisition module 134 to request a user signature through the device communication standards. Signature acquisition module 134 provided either separately from signature input device 132, such as at separate processing device 136, or provided at signature input device 134, creates digitally-signed electronic document 112 including digital signature 120 from the user signature acquired from the signature input device 132.

Host computer 102 may acquire other documents, including, but not limited to, user identification document 110. User identification document 110 may include user identification information at, for example, fields 140a and 140b, such as a user, e.g., a customer name and address, respectively. User identification document 110 may also include, for example, at least one characteristic image 144, which may be, for example, a state seal. User identification document 110 may also include one or more of a mono-dimensional code, such as barcode 146, or bi-dimensional codes, such as a Quick Response (QR) code.

Host computer 102 may communicate with database 104 over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and may use various communication protocols, such as Ethernet, Bluetooth, WiFi, 802.11, etc. Other wireless protocols can also be used. Host computer 102 may be a PC, a server, a laptop, or any other type of computing device. Furthermore, the functionality of host computer 102 may be achieved on one physical chassis or may be distributed across a number of chassis without departing from the scope of the disclosure. Database 104 may be a flat file database or a relational database. Examples of relational databases include Oracle®, IBM DB2®, MySQL®, PostgreSQL®, SQLite®, Microsoft's SQL server®, Sybase®, Microsoft Access®, etc.

Figure 2:
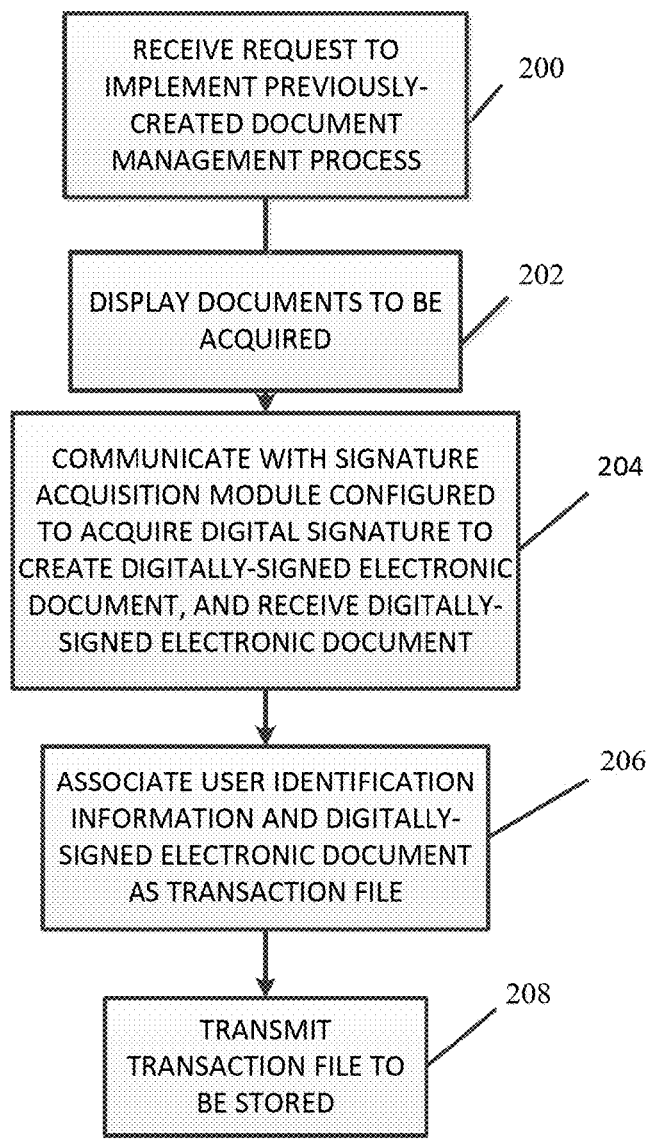
FIG. 2 includes a flowchart illustrating a method of an exemplary embodiment of the present teachings.

FIG. 2 is a flowchart illustrating a method of an exemplary embodiment of the present teachings. In at least one embodiment, a request to implement a previously-created document management process is received (operation 200). An indication of a set of documents to be acquired from a plurality of documents identified in the previously-created document management process is displayed at GUI 104 at host computer 102, based on a previously-created document management process (operation 202). The indicated documents to be acquired include, but are not limited to, at least one document 112 comprising a digital signature 120. The indicated documents may also include any of a plurality of document types, including, but not limited to, for example, at least one user identification document 110.

A document management application, as will be described in more detail below, supporting one or more integration protocols communicates with signature acquisition module 134 configured to acquire a digital signature from signature input device 132 to create a digitally-signed electronic document (operation 204).

An association in the form of a transaction file is created between user identification information and digitally-signed electronic document 112 comprising digital signature (operation 206). The transaction file is a file indicative of a single customer transaction, such as a mortgage application or a marriage certificate application. The transaction file is transmitted to be stored in database 106 (operation 208).

Figure 3A:
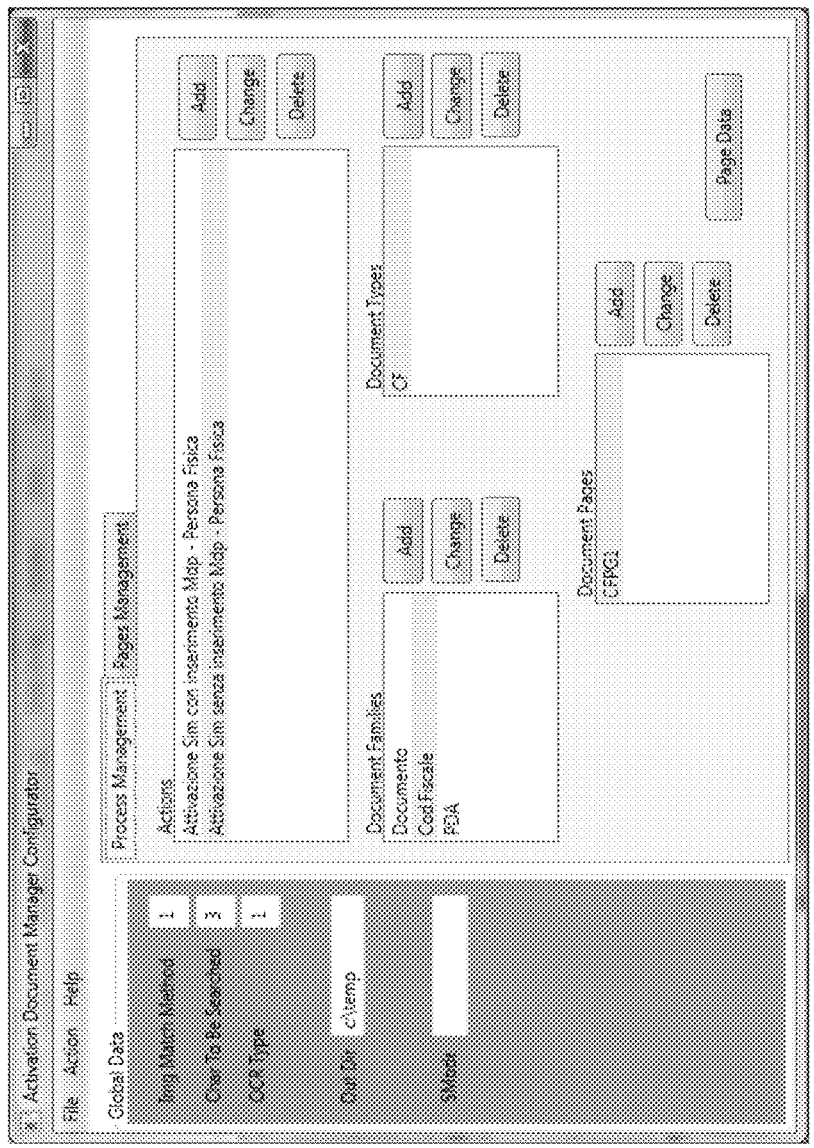
FIG. 3A includes a screen shot illustrating an exemplary configuration of a document management configuration process in accordance with an exemplary embodiment of the present teachings.
Figure 3B:
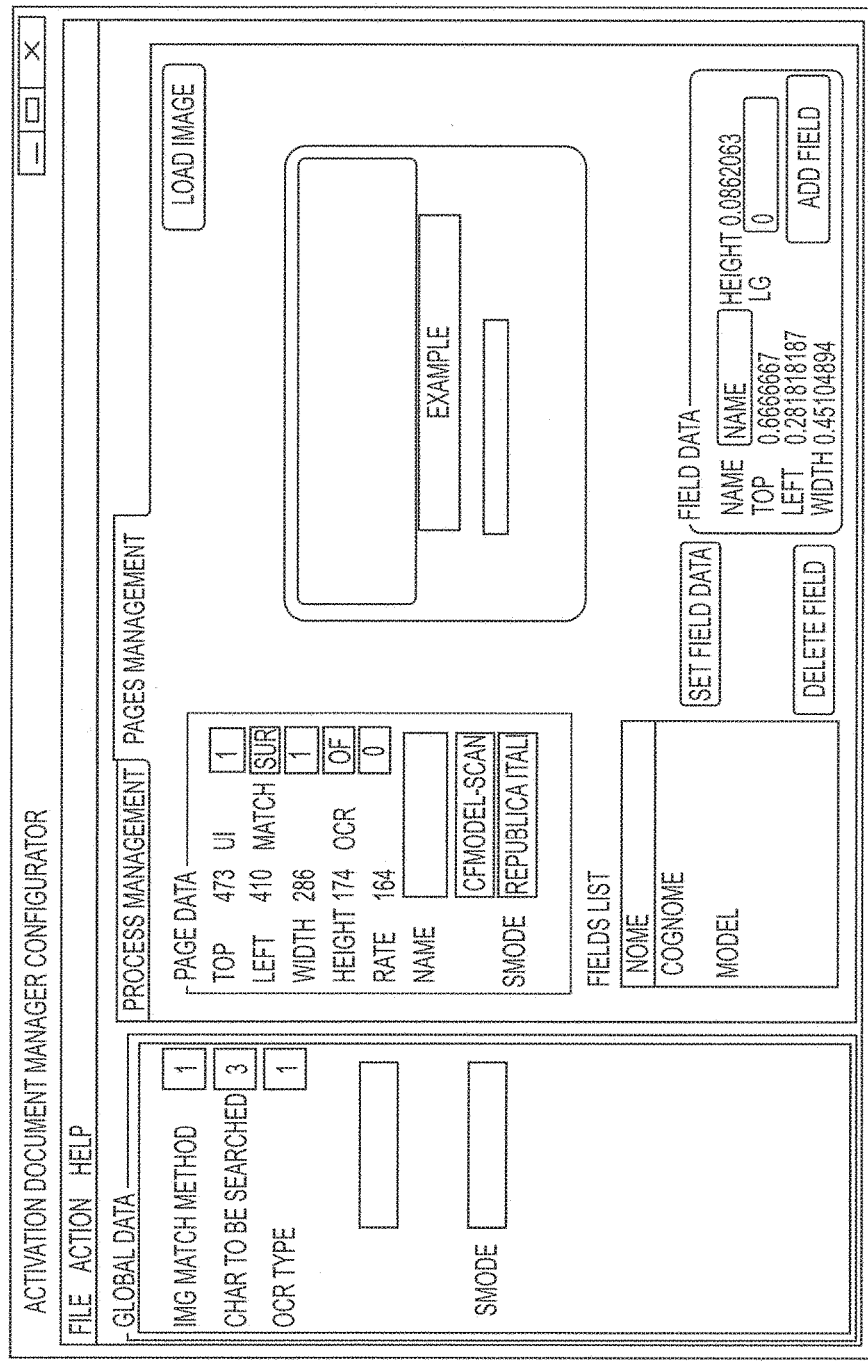
FIG. 3B includes a screen shot illustrating an exemplary configuration of a document management configuration process in accordance with an exemplary embodiment of the present teachings.

In an exemplary embodiment, as will be discussed below, a document management process is created by an administrator using a document management application, and documents and procedures for acquiring the documents are displayed at GUI 106 at host computer 102 in order to guide a user, such as an operator who is to acquire the documents, in the acquisition of the documents in accordance with the indicated procedures. FIGS. 3A and 3B are screen shots 210, 212 illustrating the document management configuration process. For example, FIGS. 3A and 3B illustrate the configuration process, including the creation of documents, document families, procedures for obtaining the documents, template creation, etc., which are all compiled as a file containing all the information to guide the acquisition process. The configuration file may be downloaded automatically from database 104 each time the user accesses the document management application on host computer 102.

Figure 4A:
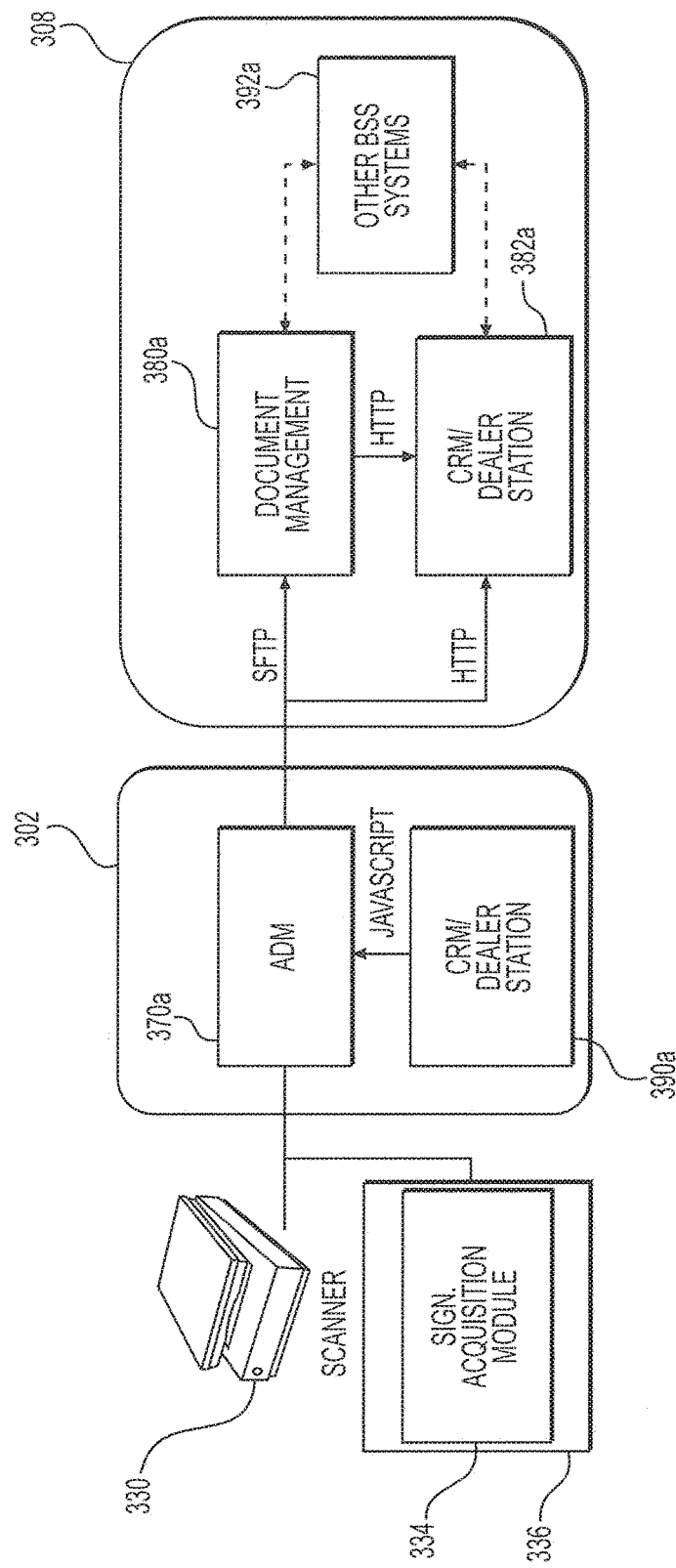
FIG. 4A is a system diagram illustrating a client solution of an exemplary embodiment of the present teachings.
Figure 4B:
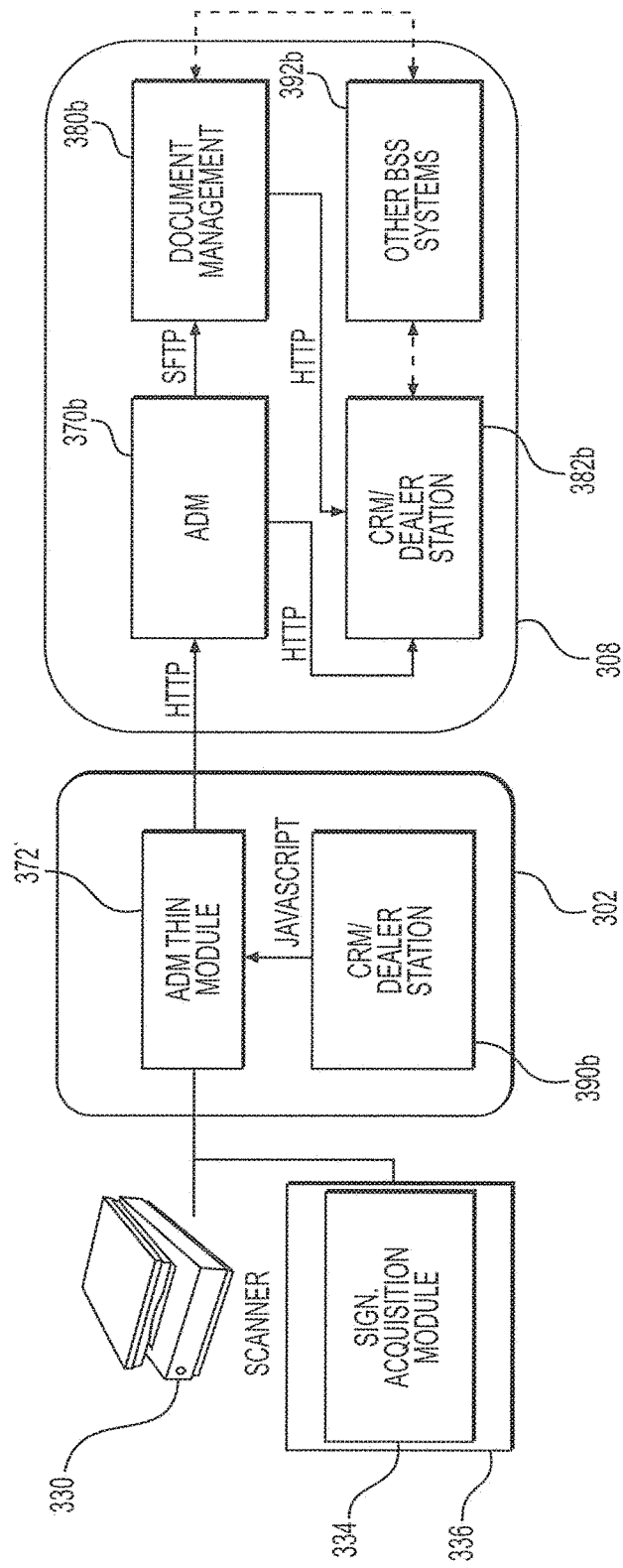
FIG. 4B is a system diagram illustrating a client-server solution of an exemplary embodiment of the present teachings.

FIGS. 4A and 4B are system diagrams of exemplary embodiments of the present teachings. FIG. 4A illustrates an exemplary document management system 300*a* comprising host computer 302 in communication with network node 308 over wired or wireless communication links or combinations thereof. Network node 308 may be a server device and host computer 302 may be a client device. Executable document management application ("ADM") 370*a*, supporting one or more integration protocols for integrating with various systems and devices, is provided to host computer 302. ADM 370*a* may be installed and executed at host computer 302 or may be run as a virtual image on the host computer 302, such as a secure virtual desktop. The virtual image of host computer 302 is a workspace virtualization that allows ADM 370*a* to be executed on the virtual image without having to be installed at host computer 302. The communication with external devices and systems is made directly by ADM 370*a* regardless of whether ADM 370*a* is executed directly on host computer 302 or on one of its virtual images, such as a secure virtual desktop, which may be created on host computer 302 and/or on a portable storage memory device 350 (see FIG. 5).

Host computer 302 communicates with scanning device 330 and with signature acquisition module 334, which may be executed at processing device 336 and which is in communication with signature input device 332 to receive a digital signature from signature input device 332. Scanning device 330 may be any device configured to form an image of an object, e.g., a document, through an image capturing mechanism and communicate the formed image to another device, such as, e.g., host computer 302. A user, e.g., a customer, relationship management system ("CRM") 390*a* may be provided at host computer 302 to facilitate execution of ADM 370*a* directly by a user on host computer 302.

Network node 308 may include and/or access one or more of document management system ("DMS") 380*a* and CRM 382*a*, which may communicate with each other. Network node 308 may additionally include other business support systems 392*a* in communication with one or more of DMS 380*a* and CRM 382*a*.

ADM 370*a* supports one or more integration protocols that allow ADM 370*a* to integrate with a variety of devices and systems. For example, ADM 370*a* supports HTTP/HTTPS, for example, for web service-based integration technologies, and FTP/SFTP, for example, for batch file-based integration technologies. ADM 370*a* provides native integration with CRM 382*a* provided at network node 308 or CRM 390*a* provided at host computer 302 and with DMS 380*a* provided at, or in communication with, network node 308 via a standard application programming interface ("API"). When ADM 370*a* is executed, available updates may be automatically downloaded from network node 308 to host computer 302.

ADM 370*a* is executed through, for example, an HTTP request from network node 308 called by CRM 382*a* at network node 308 or directly by a user through CRM 390*a* at host computer 302. When ADM 370*a* is called by CRM 382*a* to execute ADM 370*a*, CRM 382*a* calls a Javascript, for example, through an HTTP/HTTPS request directly on host computer 302. When ADM 370*a* is executed to implement a document management process, ADM 370*a* may request to acquire a signature, through input device 332 communication standards, to signature acquisition module 334. CRM 382*a* or 390*a* may transmit a PDF of an electronic document, such as a contract, and identification data directly to signature acquisition module 334. When ADM 370*a* requests a signature on, for example, the contract transmitted from CRM 382*a* or 390*a* to signature acquisition module 334, signature acquisition module 334 requests and obtains a signature through signature input device 332 (see FIG. 5) to create digitally-signed electronic document 312 (see FIG. 5).

When ADM 370*a* is executed through, for example, an HTTP request from network node 308, and the document management process is implemented, scanning device 330 communicates with host computer 302 or the virtual image of host computer 302 at host computer 302 to provide the formed image from scanning device 330 to host computer 302. ADM 370a controls scanning device 330 by an applications programming interface (API), such as TWAIN or Windows Image Acquisition (WIA), through, for example, an ActiveX control installed at host computer 302. Scanning device 330 may obtain an image of a document, such as user identification document 310 (see FIG. 5) and transmit the obtained image to ADM 370a residing at host computer 302. At ADM 370a, the images may be cropped to the important portions, indicated by a document template to which the image is compared, as will be discussed in more detail below, and the images may be compressed to reduce the file size.

After documents, such as digitally-signed electronic document 312 and user identification document 310, are obtained, the documents and/or images are collected together as a transaction file, which may also include user, e.g., customer, information. The transaction file may be digitally signed, encrypted and compressed directly at host computer 302. Then the compressed transaction file is transmitted from ADM 370a to a document management system, such as DMS 380a, through, for example, an FTP/STFP transmission.

FIG. 4B illustrates an exemplary document management system 300b comprising host computer 302 in communication with network node 308 over wired or wireless communication links or combinations thereof. Network node 308 may be a server device and host computer 302 may be a client device. Executable document management application ("ADM") 370b, supporting one or more integration protocols for integrating with various systems and devices, is provided and executed at network node 308. According to the alternate embodiment, primary functionalities of ADM 370b occur at network node 308. Document management module 372 is provided at host computer 302 and communicates with ADM 370b at network node 308.

Host computer 302 communicates with scanning device 330 and with signature acquisition module 334, which may be executed at processing device 336 and which is in communication with signature input device 332 to receive a digital signature from signature input device 332. Document management module 372, which may be a so-called "document management thin module", includes functionalities to obtain and compile information to and from external devices, such as scanning device 330, signature input device 332 through signature acquisition module 334, or portable storage memory device 350 (see FIG. 5). For example, document management module 372 communicates with and obtains images from scanning device 330 and communicates with and obtains, for example, a digitally-signed electronic document from signature acquisition module 334.

A user, e.g., a customer, relationship management system ("CRM") 390b may be provided at host computer 302 to facilitate execution of document management module 372 directly by a user on host computer 302.

Network node 308 may include and/or access one or more of document management system ("DMS") 380b and CRM 382b, which may communicate with each other. Network node 308 may additionally include other business support systems 392b in communication with one or more of DMS 380b and CRM 382b. CRM 382b may facilitate execution of ADM 370b at network node 308.

Similar to ADM 370a, ADM 370b supports one or more integration protocols that allow ADM 370b to integrate with a variety of devices and systems. For example, ADM 370b supports HTTP/HTTPS, for example, for web service-based integration technologies, and FTP/SFTP, for example, for batch file-based integration technologies. ADM 370b provides native integration with CRM 382b provided at network node 308 and with DMS 380b provided at, or in communication with, network node 308 via a standard API. CRM 390b may communicate with document management module 372, which is in communication with ADM 370b at network node 308.

ADM 370b is executed through, for example, an HTTP request from network node 308 called by CRM 382b at network node 308 or directly by a user through CRM 390b at host computer 302. A Javascript may be called, for example, through an HTTP/HTTPS request directly on ActiveX control at host computer 302, which implements the document management process. When ADM 370b is executed to implement a document management process, ADM 370b may request to acquire a signature, through the input device 332 communication standards, to signature acquisition module 334. CRM 382b or 390b may transmit a PDF of a contract and identification data directly to signature acquisition module 334. When ADM 370a requests a signature on, for example, the contract transmitted from CRM 382b or 390b to signature acquisition module 334, signature acquisition module 334 requests and obtains a signature through signature input device 332 (see FIG. 5) to create digitally-signed electronic document 312 (see FIG. 5). Digitally-signed electronic document 312 is transmitted, through the input device 332 communication standards, to host computer 302 and collected by document management module 372.

When ADM 370b is executed through, for example, an HTTP request from network node 308, and the document management process is implemented, scanning device 330 communicates with host computer 302 through document management module 372 to provide the formed image from scanning device 330 to host computer 302. ADM 370b controls scanning device 330 by communication standards, such as TWAIN or Windows Image Acquisition (WIA), through, for example, an ActiveX control installed at host computer 302. Scanning device 330 may obtain an image of a document, such as user identification document 310 (see FIG. 5) and transmit the obtained image to document management module 372, which collects the obtained image, residing at host computer 302. At document management module 372, the images may be cropped to the important portions, indicated by a document template to which the image is compared, as will be discussed in more detail below, and the images may be compressed to reduce the file size.

After documents, such as digitally-signed electronic document 312 and user identification document 310, are collected by document management module 372 at host computer 302, documents, such as digitally-signed electronic document 312, and/or one or more images, such as an image of user identification document 310, are transmitted to ADM 370b through, for example, HTTP/HTTPS transmissions. The documents and/or images are collected together at ADM 370b as a transaction file, which may also include user, e.g., customer, information. The transaction file may be digitally signed, encrypted and compressed at network node 308. The transaction file may be started, stopped, and updated at a later time. Then the compressed transaction file is transmitted from ADM 370b to a document management system, such as DMS 380b, through, for example, an FTP/STFP transmission.

The embodiment of FIG. 4A is more suitable for implementations in which the network connection is strong and adequate bandwidth is provided, while the embodiment of FIG. 4B is more suitable for implementations in which the network connection is intermittent and adequate bandwidth is not provided.

Figure 5:
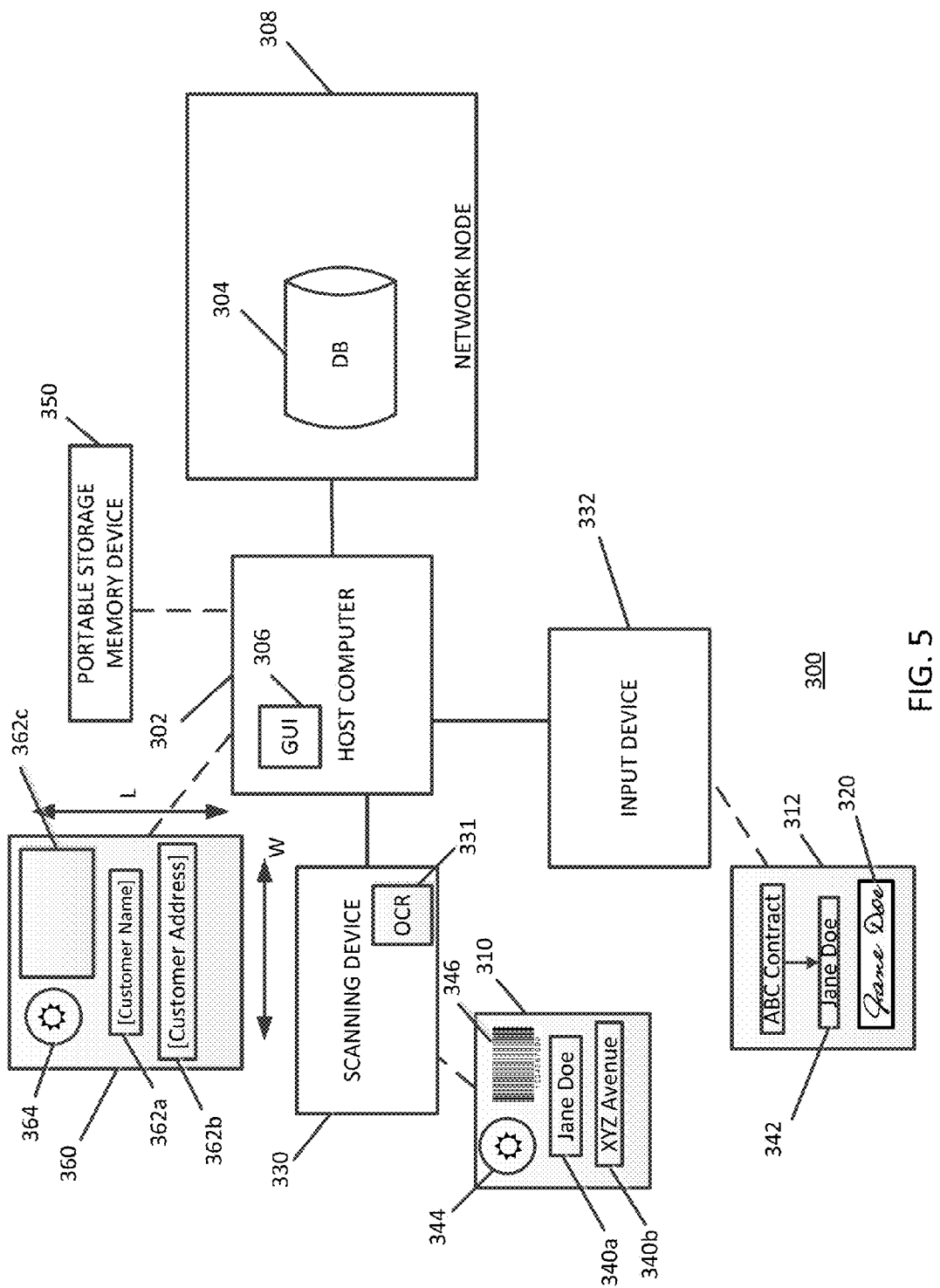
FIG. 5 includes a detailed schematic diagram of an exemplary embodiment of the present teachings.

FIG. 5 is a schematic diagram illustrating an exemplary document management system 300 comprising host computer 302 in communication with network node 308 over wired or wireless communication links or combinations thereof. Host computer 302 comprises graphical user interface (GUI) 306. Database 304 may be located at, for example, network node 308. Database 304 may be provided at DMS 380a, 380b. One or more portable storage memory devices 350, for example, a USB flash drive, etc. may be provided, which are configured to interface with host computer 302 and store data, including, but not limited to, the executable ADM 370a capable of being loaded onto host computer 302 from portable storage memory device 350. ADM 370a may be run on a virtual image of host computer 302 provided from portable storage memory device 350.

Host computer 302 may communicate, through ADM 370a or document management module 372 in conjunction with ADM 370b, with scanning device 330 and/or signature input device 332 to obtain, for example, user identification document 310 or digitally-signed electronic document 312 comprising digital signature 320. Communication and transport of data between scanning device 330 and host computer 302 occurs through, for example, an ActiveX control installed at host computer 302, which interfaces with communication standards, such as TWAIN or WIA, supported by ADM 370a, 370b. Communication and transport of data between signature input device 332 and host computer 302 occurs through the signature input device 332 software communication standards from ADM 370a and/or document management module 372 to signature acquisition module 334, which requests and obtains a signature through signature input device 332 to create digitally-signed electronic document 312. Digitally-signed electronic document 312 is transmitted, through the signature input device 332 software communication standard to host computer 302 and collected by either ADM 370a or by document management module 372, which thereafter transmits electronic document 312 to ADM 370b through an HTTP/HTTPS transmission. ADM 370a, 370b support the integration protocols that allow for communication with and document and image acquisition from, for example, scanning device 330, signature input device 332, through signature acquisition module 334, and portable storage memory device 350.

Scanning device 330 may be configured to form an image of an object, e.g., user identification document 310, through an image capturing mechanism. User identification document 310 may include user identification information at, for example, fields 340a and 340b, such as a user, e.g., a customer, name and address, respectively. User identification document 310 may also include, for example, at least one characteristic image 344, such as an image of a state seal. User identification document 310 may also include one or more codes, such as a mono-dimensional code, e.g., barcode 346, or bi-dimensional codes, e.g., a Quick Response (QR) code. Scanning device 330 is controlled by ADM 370a, 370b to obtain one or more images of a document, such as user identification document 310, by communication standards, such as TWAIN or Windows Image Acquisition (WIA), through, for example, an ActiveX control installed at host computer 302. Scanning device 330 communicates the formed image to ADM 370a or document management module 372 installed at host computer 302 or on a virtual image of host computer 302. Scanning device 330 may include, but is not limited to, for example, a document scanner, such as an automatic document-feeder (ADF) scanning device, a flat-bed scanning device, devices that receive printed images as input, and digital cameras that receive optical images as input.

Template 360 may be created and stored for a previously-created document management process implemented through ADM 370a, 370b and, as will be described in more detail below, to be used in document type recognition. Template 360 is indicative of a type of document. Templates, such as template 360, may indicate a type of user identification document, such as a driver's license or a tax indication document, or a type of document comprising an electronic signature, such as a digitally-signed electronic document. Template 360 may have dimensions L, W used to define the type of document. Template 360 may also include one or more of fields 362a-362c, from which data is to be extracted. For example, fields 362a-362b may correspond to fields in a document, such as user identification document 310, from which a customer name and a customer address may be extracted. Field 362c, for example, may correspond to a field in a document, such as user identification document 310, from which other indications, such as a mono-dimensional or bi-dimensional barcode, may be extracted. Template 360 may also include characteristic images 364, which may be used to define the type of document. Characteristic image 364 is a characteristic of the type of document that differentiates the type of document from another document. For example, a characteristic image that is a state seal may indicate a driver's license or a Ministry of Finance symbol may indicate a tax identification document.

Scanning device 330 may include an optical character recognition (OCR) library 331 to facilitate translation of scanned images into machine-encoded text. ADM 370a, 370b communicates with OCR library 331 or another external OCR library to extract data from the scanned images of, for example, user identification document 310. The extracted data extracted from document 310 may be a simple text field corresponding to, for example, fields 362a, 362b of template 360. The extracted data may be an image corresponding to, for example, characteristic image 364. The extracted data, for example, a mono-dimensional or bi-dimensional barcode, may be extracted from a field corresponding to, for example, field 346 of template 360.

ADM 370a or document management module 372 may rotate and crop acquired images only to parts indicated as important according to template 360 in order to reduce the size of the image file. ADM 370a or document management module 372 may also compress the image file to reduce the file size.

Input device 332, which may be a signature input device, may be any device configured to receive user input from a user, for example, a signature of a user. Signature input device 332 may be any device providing input and operation capabilities, for example, a tablet computer having input and operation capabilities through a display, such as a touchscreen, which receives input either directly from physical user touch or from stimulus through, for example, a stylus. Signature input device 332 may receive the user input, such as a signature, at signature input device 332, or may display a document, such as an electronic document, at input device 332 and receive input from a user, such as a signature, on the displayed electronic document, to form digitally-signed electronic document 312 comprising digital signature 320. Signature input device 332 may communicate with signature acquisition module 334, which may be executed at signature input device 332 or at separate processing device 336.

Signature acquisition module 334 requests and acquires digital signature, e.g., signature 320, from signature input device 332. When signature acquisition module 334 is provided and executed separately from signature input device 332 at, for example, processing device 136, signature input device 332 may receive the user input, such as a signature, at signature input device 332 and transmit a digital form of the signature to form digitally-signed electronic document 312 comprising digital signature 320. One of ordinary skill in the art would recognize that, although a signature is described, any of a variety of input indications from a user may be received at signature input device 332 that indicates that a user has provided proof of identity and intent with respect to the electronic document, such as, for example, user initials or any other indicative mark. Digitally-signed electronic document 312 may also include user identification information at, for example, field 342, such as a customer name.

One of ordinary skill may recognize that, while input device 332 is shown separate from host computer 302 or separate processing device 336, input device 332 may be incorporated into host computer 302 or processing device 336 and digitally-signed electronic document 312 comprising digital signature 320 may be created at host computer 302 or processing device 336.

Figure 6:
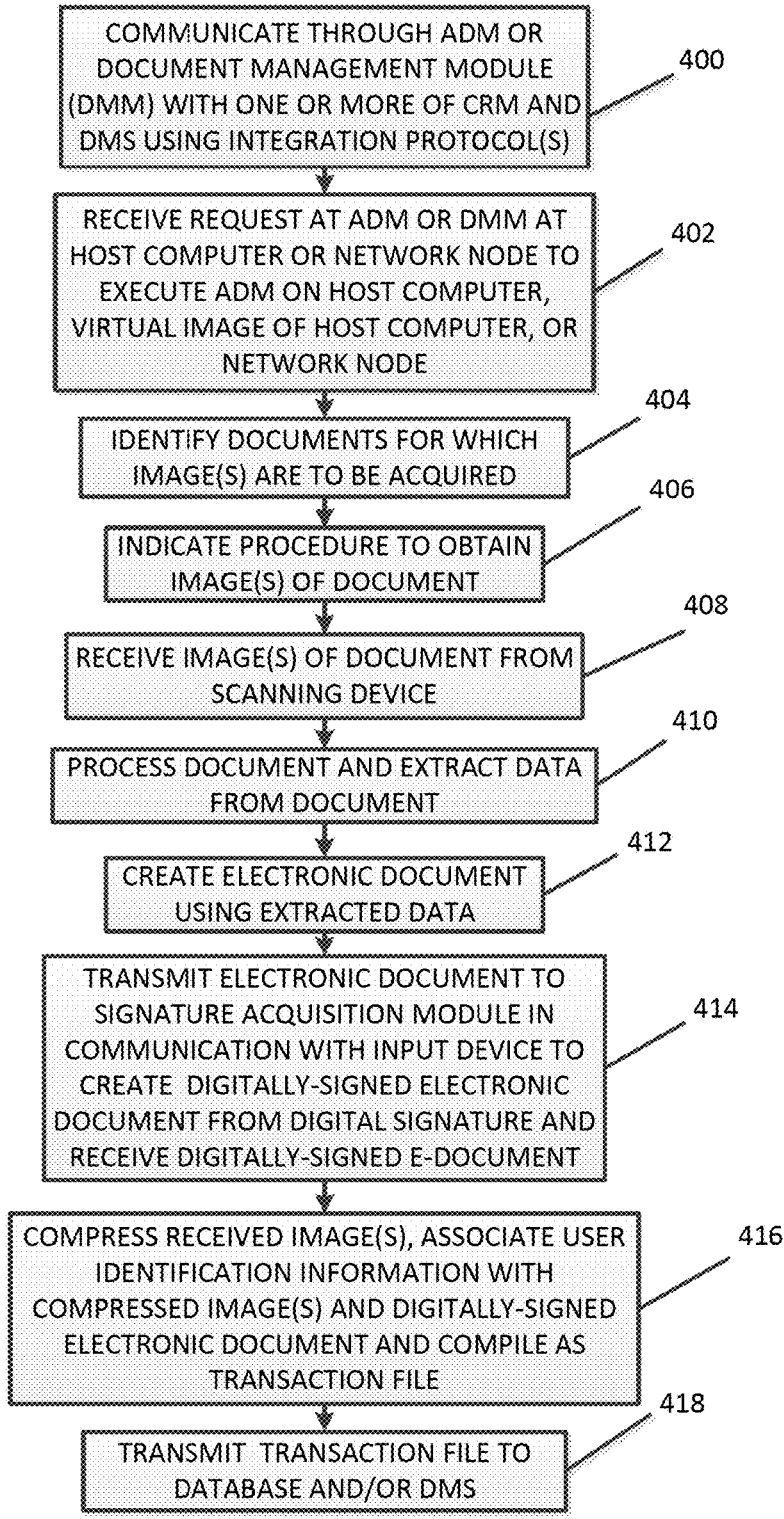
FIG. 6 includes a flowchart illustrating the method of the exemplary embodiment of the present teachings.

FIG. 6 is a flowchart illustrating the method of the exemplary embodiment of the present teachings. ADM 370a, 370b and/or document management module 372 may communicate with one or more of user relationship management system 390a, 390b, 382a, 382b and document management system 380a, 380b using one or more integration protocols. For example, ADM 370a, 370b supports HTTP/HTTPS, for example, for web service-based integration technologies, and FTP/SFTP, for example, for batch file-based integration technologies (operation 400). A request at ADM 370a, 370b or document management module at host computer 302 or network node 308 372 is received to execute ADM 370a, 370b on host computer 302, virtual image of host computer 302 on host computer 302, or network node 308 (operation 402). The request may be, for example, an HTTP request from network node 308 called by CRM 382a, 382b at network node 308 or directly by a user through CRM 390b, 392a on host computer 302.

When the document management process is implemented, host computer 302 identifies at GUI 306 documents for which images of the documents are to be acquired, based on a previously-created document management process (operation 404). The documents may include user identification document 310. Host computer 302 indicates at GUI 306 a procedure to obtain the image of the identified document, based on the previously-created document management process (operation 406). The procedure indicates how to scan a document, e.g., user identification document 310, such as whether to scan one or both sides of user identification document 310. After host computer 302 indicates the documents and indicates the procedure for obtaining user identification document 310 at GUI 306, one or more users, such as an operator who implements the previously-created document management process, assist in the acquisition of the indicated documents in accordance with the indicated procedure. The operator accesses scanning device 330 and causes an image of the indicated user identification document 310 to be created at the scanning device 330 by scanning user identification document 310 according to the indicated procedure, for example, by scanning one or both sides of user identification document 310. Once the image(s) of the user identification document 310 are obtained, the images are transmitted from scanning device 330 and received by host computer 302 through, for example, WIA or TWAIN standard communication protocols (operation 408). The document management application may include an image manipulation function, which allows the image of the scanned document to be cropped and/or rotated in order to assist in automatically identifying the document, as will be described in more detail below. Host computer 302 may display progress bars at GUI 306 indicating the progress of obtaining a document, such as user identification document 310.

The image of user identification document 310 may be processed to extract data from user identification document 310, such as user identification information from fields 340a, 340b (operation 410). The extracted data may be used to create an electronic document, such as a contract, for example (operation 412). In the alternative, instead of creating the electronic document with data extracted from user identification document 310 (operation 412), an electronic document can be created based on information input at host computer 302. The created electronic document is transmitted to signature acquisition module 334 in communication with input device 332 to create digitally-signed electronic document 312 (operation 414). Input device 332 may obtain a digital signature and signature acquisition module 334 may combine the digital signature with an electronic document. In the alternative, input device 332 may include a display at which a user may input a signature on an electronic document displayed thereon provided by signature acquisition module 334. Once a digitally-signed electronic document, such as document 312, is created comprising digital signature 320, then the digitally-signed electronic document 312 comprising digital signature 320 is transmitted to, and received at, host computer 302.

One of ordinary skill in the art would recognize that, when ADM 370a is executed at host computer 302, documents, such as user identification document 310 or digitally-signed electronic document 312 may be compiled and processed at host computer 302 and data may be extracted from, for example, user identification document 310 at host computer 302. In an alternative embodiment, when ADM 370b is executed at network node 308 and document management module 372 is executed at host computer 302, documents, such as user identification document 310 or digitally-signed electronic document 312 may be compiled at host computer 302 and transmitted to network node 308 for processing to occur at network node 308.

One or more images of identified documents, such as user identification document, is received at ADM 370a, 370b and compressed to reduce the file size. Digitally-signed electronic document 312, for example, is received at ADM 370a, 370b. The one or more compressed images of identified documents, digitally signed electronic document 312, and user identification information are compiled as a transaction file (operation 416). The user identification information may be obtained after receiving and processing the acquired images at ADM 370a, 370b or may be obtained from user input. For processing purposes, the images may be cropped to specific portions of the images of documents 310, 312 and the cropped images may be saved in the transaction file. In addition, outcomes of any accuracy or consistency checks performed on data extracted from the document may also be included in the transaction file. The transaction file is transmitted to database and/or DMS 380a, 380b (operation 418).

In an exemplary embodiment, the document management process guides the user, e.g., the operator, in a step-by-step process in selecting the documents for which images are to be acquired, indicating the procedures necessary for acquiring the images, providing easy usability.

Figure 7:
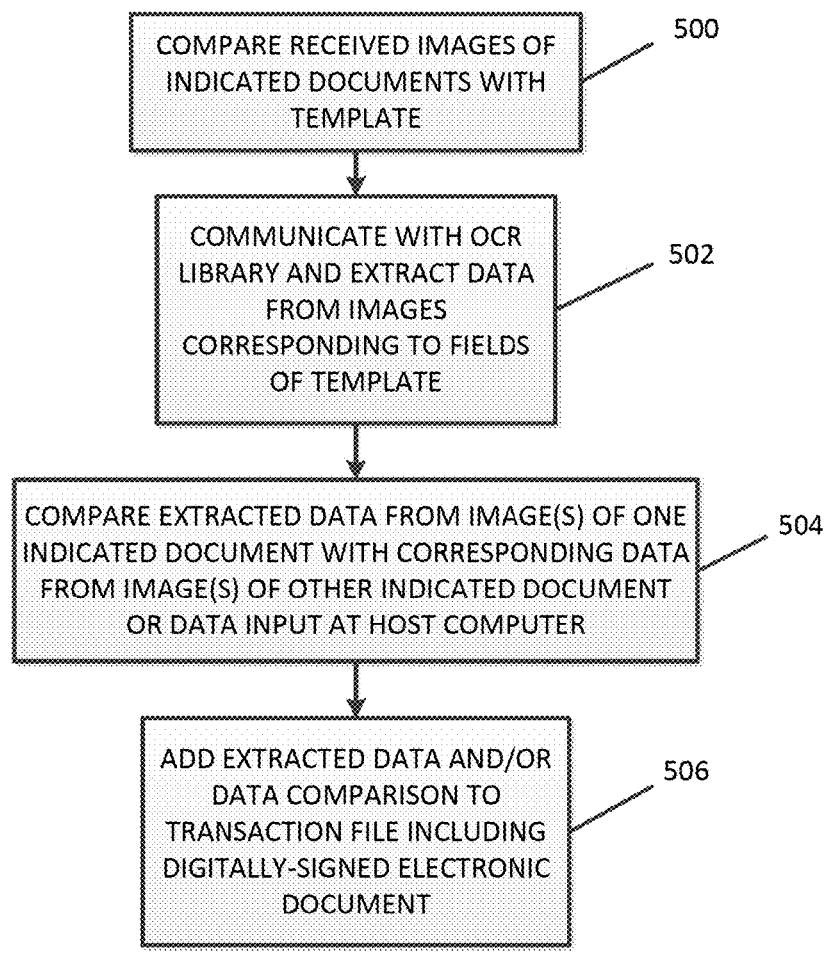
FIG. 7 includes a flowchart illustrating the method of the exemplary embodiment of the present teachings.

FIG. 7 is a flowchart illustrating the method of the exemplary embodiment of the present teachings. After the images of indicated documents, such as user identification document 310, are received at host computer 302, each of the received images may be compared with template 360, created in a previously-created document management process, indicative of a type of document in order to automatically identify the indicated document (operation 500). Templates, such as template 360, may be used to indicate a type of user identification document, such as a driver's license or a tax indication document, or a type of document comprising an indication of a customer action, such as a signed contract. Template 360 is indicative of a type of document and defines at least one of dimensions L, W, textual characteristics, fields 362a-362c, which may include textual strings or indications such as a mono-dimensional or bi-dimensional barcode, and one or more characteristic images 364.

Strings of data are extracted from the one or more images corresponding to specific fields, e.g., fields 362a-362c of template 360 (operation 502). The data may be extracted by performing optical character recognition on the images to obtain textual strings of data. As discussed above, ADM 370a, 370b communicates with OCR library 331 or another external OCR library to extract data from the scanned images of, for example, user identification document 310. For example, data, such as customer name "Jane Doe", may be extracted from field 340a, which corresponds to customer name field 362a, or customer address "XYZ Avenue" may be extracted from field 340b, which corresponds to customer address field 362b. Data that may be extracted may include, for example, information from representative images. For example, the representative images may be mono- or bi-dimensional barcodes and the information represented by the barcodes may be read by and extracted from the images of documents 310, 312.

The extracted data, such as the user name "Jane Doe", from one or more images of one of the documents 310, 312 may be compared with corresponding data from one or more images of another of documents 310, 312 or data input at host computer 302 (operation 504). For example, data, such as user name "Jane Doe", may be extracted from field 340a, which may be recognized as a field indicative of a customer name, of the user identification document 310. In addition, data, such as user name "Jane Doe", may be extracted from field 342, which may be recognized as a field indicative of a user name, of digitally-signed electronic document 312. Then the data from field 340a of user identification document 310 is compared with data from field 342 of electronic document 312 comprising digital signature 320. If a document is not properly recognized, ADM 370a, 370b may re-decode a portion of document 310, 312 that is not properly recognized.

Indications of the consistency of the data may be displayed at GUI 306 when two or more sets of extracted data are compared with each other. A "confidence interval" may be defined in the document management configuration file to indicate an acceptable difference between two or more sets of extracted data that are compared with each other. The "confidence interval" is set because detection rates on the document type depend on the quality of the scanned image, and on the optical character recognition tools used to recognize characters. For example, the "confidence interval" may be set to ten percent and the document management process may consider the extracted data to be consistent with each other if the two or more sets of compared data do not differ by more than ten percent. The document management application may indicate the correctness of data in relation to data initially input at host computer 302. The extracted data may also compared with data, such as user name information, input initially at host computer 302. In the standard embodiment, the input at host computer 302 comes from external systems, such as CRM 390a, 390b, through HTTP/HTTPS transmissions (operations 400-402).

Some or all of the extracted data from the user identification document 310 or the digitally-signed electronic document 312 comprising digital signature 320, and the comparison information, may be associated with the acquired image(s) and the digitally-signed document 312 in the transaction file (operation 506).

Figure 8:
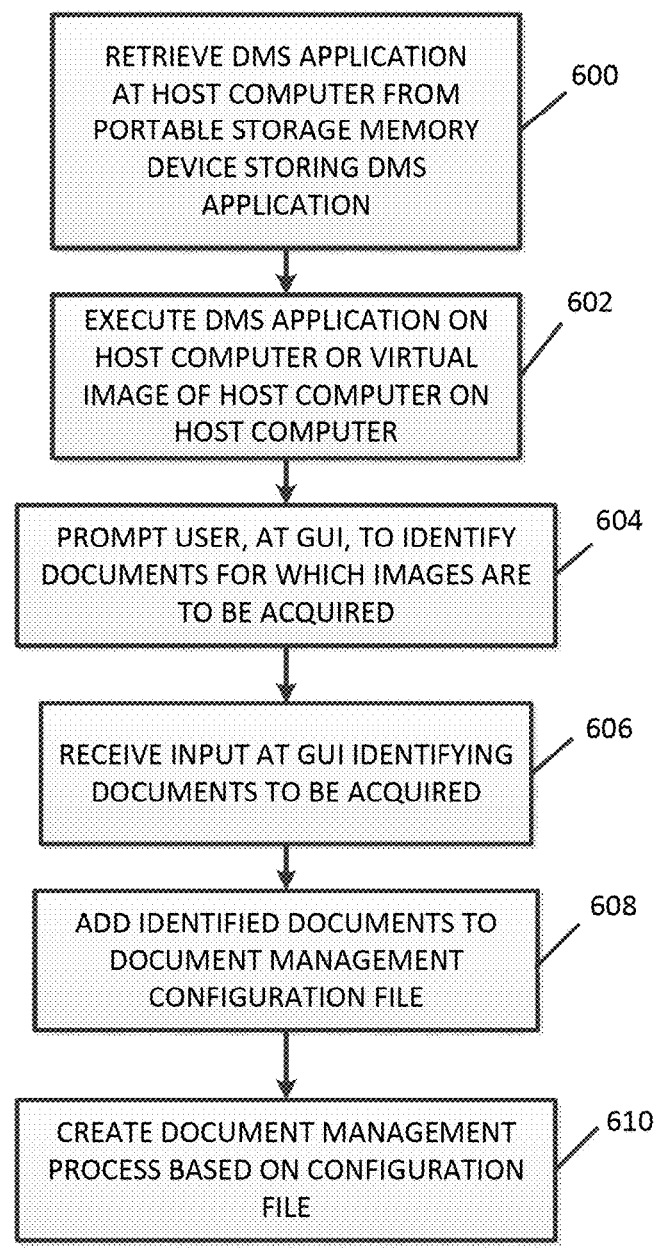
FIG. 8 includes a flowchart illustrating the method of the exemplary embodiment of the present teachings.

FIG. 8 is a flowchart illustrating a method of an exemplary embodiment of the present teachings in which a configuration file is created. An executable document management application is retrieved at host computer 302 from portable storage memory device 350, which is logically coupled to host computer 302, that stores the executable document management application (operation 600). The document management application is executed on host computer 302 after retrieving the executable document management application from portable storage memory device 350 or is executed on a virtual image of host computer 302 on host computer 302, and GUI 306, created from the executed document management application, is provided at host computer 302 to receive input (operation 602). For example, after execution of the document management application, GUI 306 is displayed at host computer 302.

A user, such as an administrator, is prompted through GUI 306 to identify documents for which images are to be acquired (operation 604). For example, the administrator may identify one or more user identification documents 310, and one or more documents 312 comprising indications 320, such as a signature, of a user action, e.g., a signed contract. The identified documents, such as documents 310, 312 may be identified and grouped as document families, where a document family is a set of document types. For example, there may be a user identification document family which may include a plurality of user identification documents, such as an identification card or a taxpayer card. There may be a document family including documents having indications of a user action, such as signed contracts.

Input is received through GUI 306 identifying the documents to be acquired (operation 606). The identified documents, such as user identification document 310 and electronic document 312, which is to receive a digital signature, are added to a document management configuration file at host computer 302 based on the received input (operation 608). The configuration file may indicate how the documents 310 are to be acquired and/or whether images of the documents should be obtained. A document management process is created based on the document management configuration file (operation 610).

In an exemplary embodiment, a user, such as the administrator, is able to create a document management process tailored to the particular needs of the administrator, such as the specific industry for which the document management process is to be created. The document management process is thereafter able to be used by an operator, such as a person who obtains the documents from a customer. The document management process may guide the operator through the document collection, including indicating the documents to be obtained, the order in which to obtain the documents, how images of the documents are to be obtained, etc.

Figure 9:
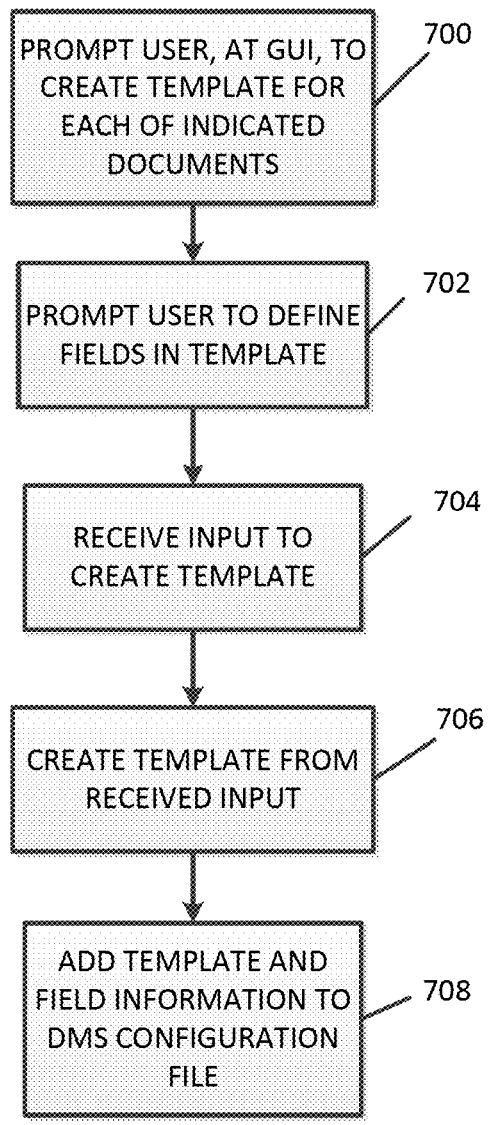
FIG. 9 includes a flowchart illustrating the method of the exemplary embodiment of the present teachings.

Turning now to FIG. 9, when the document management application is executed at host computer 302, a user, such as an administrator, may be prompted through GUI 306 to define a template, such as template 360 for each of indicated documents 310, 312 (operation 700). As discussed above, template 360 can be created for each type of indicated document and the user may be prompted to define at least one of dimensions L, W, textual characteristics and one or more characteristic images 364. Dimensions L, W, textual characteristics and characteristic images 364 define the type of document template 360. The user may be prompted to define fields, e.g., 362a-362c within template 360 from which data should be extracted (operation 702). Fields 362a-362c may be defined based on relative location within the document and the size of fields 362a-362c may be defined.

Input is received through GUI 306 to define template 360 (operation 704). Template 360 is created based on the received input (operation 706). After template 360 is created by the user, such as an administrator, template 360 and template field information are added to the document management configuration file (operation 708).

Figure 10:
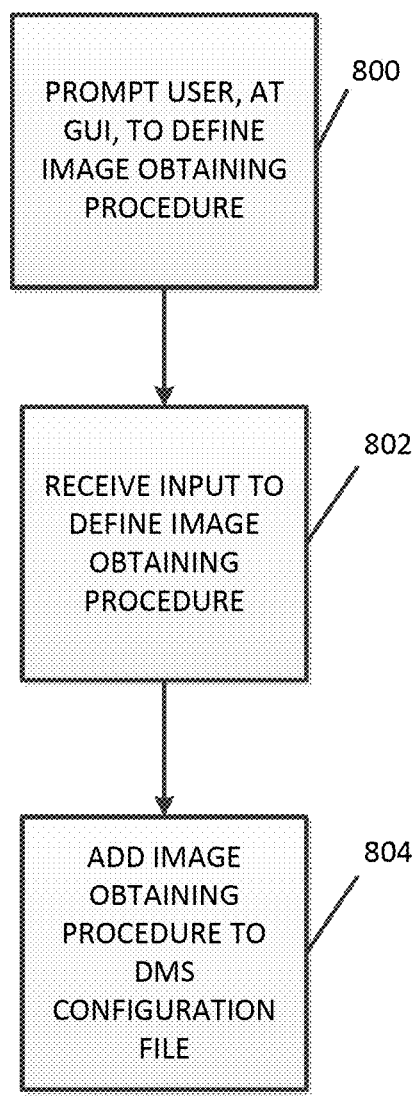
FIG. 10 includes a flowchart illustrating the method of the exemplary embodiment of the present teachings.

Referring to FIG. 10, when the document management application is executed at host computer 302, a user, such as an administrator, may be prompted through GUI 306 to define an image obtaining procedure to obtain one or more images of customer identification document 310 (operation 800). The image obtaining procedure may indicate whether to scan one or both sides of customer identification document 310. Input is received through GUI 306 to define the image obtaining procedure (operation 802). The image obtaining procedure is thereafter added to the document management configuration file (operation 804).

In accordance with the present disclosure, a method of managing documents may be provided including communicating, by one or more of a document management application supporting one or more integration protocols and a document management module in communication with the document management application, with one or more of a user relationship management system and a document management system using the one or more integration protocols. The method also includes receiving a request at one of a document management application and a document management module from the user relationship management system to execute the document management application comprising a previously-created document management process and implement the previously-created document management process. The method further includes displaying, on a graphical user interface at a host computer, an indication of a set of documents to be acquired from a plurality of documents identified in the previously-created document management process, the set of documents comprising at least one document comprising a digital signature. The method additionally includes communicating, by one or more of the document management application supporting one or more integration protocols and the document management module in communication with the document management application, with a signature acquisition module using the one or more integration protocols configured to acquire a digital signature from a signature input device to create a digitally-signed electronic document. The method includes receiving the digitally-signed electronic document created with the digital signature from the signature acquisition module; creating an association in the form of a transaction file between user identification information and the digitally-signed electronic document; and transmitting the transaction file to be stored in a database. The document management system may comprise the database.

The method may include communicating, by one or more of the document management application supporting the one or more integration protocols and the document management module in communication with the document management application, with a scanning device using the one or more integration protocols, the scanning device configured to acquire one or more images of one of the set of documents to be acquired identified in the previously-created document management process, the previously-created document management process indicating an image acquisition procedure at the graphical user interface; receiving the acquired one or more images of one of the set of documents; and adding the one or more acquired images to the transaction file before transmitting the transaction file to the database.

The method may also include compressing the one or more obtained images at one or more of the document management application and the document management module to reduce a size of the transaction file before transmitting the transaction file to the database.

The method may include comparing at least one of the received images of one of the set of indicated documents to a document template to automatically identify the one indicated document, the document template being created in the previously-created document management process and defining at least one of dimensions, textual characteristics, at least one characteristic image, the at least one characteristic image being a characteristic of the indicated document that differentiates the indicated document from other documents, the template including fields defined therein from data is to be extracted, communicating, through the document management application, with an optical character recognition (OCR) library and extracting data from the at least one received image corresponding to the defined fields within the document template using the OCR library, and adding the extracted data to the transaction file. The method may also include comparing the extracted data with one or more of corresponding data extracted from another of the set of indicated documents and user data input at the graphical user interface.

The method may additionally include creating the electronic document to receive the digital signature thereon from the extracted data; and transmitting the created document to the signature acquisition module in communication with the signature input device to receive the digital signature, input at the signature input device, on the electronic document.

The method may include receiving a request from the host computer at a network node to execute the document management application at the network node including the previously-created document management process.

The method may include executing the document management application including the previously-created document management process on one or more of the host computer and a virtual image of the host computer provided from a portable storage memory device.

In accordance with the present disclosure, documents, which includes one or more of at least one user, e.g., customer, identification document and at least one document comprising an indication of a user action, such as a signature, are indicated at a graphical user interface at a host computer to be acquired based on a previously-created document management process. One or more images of the indicated documents are received at the host computer. User, or customer, identification information, one or more images of the user identification document, and one or more images of the document comprising the indication of a user action are associated together as a transaction file. The transaction file is transmitted to be stored in a database.

Data may be extracted from at least one of the one or more images of the user identification document and the one or more images of the document comprising the indication of the user action. The extracted data may be added to the transaction file. Data, which may comprise user identification information, extracted from the one or more images of one of the indicated documents may be compared with corresponding data from the one or more images of another of the indicated documents.

In accordance with the present disclosure, the host computer communicates with a scanning device, which is configured to scan the user identification document to obtain the one or more images of the user identification document and to transmit the obtained one or more images to the host computer. A procedure, which is based on the previously-created document management process, to obtain the one or more images of the user identification document may be indicated at the graphical user interface at the host computer. The procedure may indicate whether to scan one or both sides of the user identification document.

In accordance with the present disclosure, the host computer communicates with a device to receive the indication of a user action. The device may be configured to receive the indication of the user action in an electronic document and to transmit an image of the electronic document with the indication of the user action to the host computer. Data extracted from one or more images of the user identification document may be used to create the electronic document to receive the indication of the user action from the extracted data. The created electronic document may be transmitted to the device to receive the indication of the user action.

At least one of the received images of the indicated documents may be compared to a template indicative of a type of document to automatically identify the indicated documents, the template being created in the previously-created document management process. The template may define at least one of dimensions, textual characteristics and at least one characteristic image for each of the indicated documents. The at least one characteristic image is a characteristic of the document that differentiates the document from other documents. Data is extracted from the one or more images of the user identification document corresponding to fields of the template indicated in the previously-created document management process. The extracted data is associated, in the transaction file, with the at least one image of the user identification document and the at least one image of the document comprising the indication of a user action.

In accordance with the present disclosure, a request is transmitted from the host computer to a network node to execute the document management application including the previously-created document management process. In accordance with another embodiment, the document management application including the previously-created document management process is executed at the host computer.

In accordance with at least one exemplary embodiment, the present disclosure provides for retrieving an executable document management application, at a host computer, executing the document management application on one or more of the host computer and a virtual image of the host computer at the host computer after retrieving the executable document management application and providing a graphical user interface, created from the executed document management application, at the host computer to receive input. A user is prompted, through the graphical user interface, to identify documents for which images are to be acquired. Input is received through the graphical user interface identifying the documents for which images are to be acquired. The identified documents are added to a document management configuration file at the host computer based on the received input. A document management process is created based on the document management configuration file.

The documents for which images are to be acquired may include at least one customer, which may be another user, identification document and at least one document comprising an indication of a customer action. The user may be prompted, through the graphical user interface, to create a template defining at least one of dimensions, textual characteristics and at least one characteristic image for each of the indicated documents to automatically identify each of the indicated documents. Input may be received from the user of at least one of the dimensions, the textual characteristics and the characteristic image to create the template, and the template may be created from the received input of at least one of the dimensions, the textual characteristics and the characteristic image. The template may be added to the document management configuration file. The user may be prompted, through the graphical user interface, to define fields within the template from which data is to be extracted. Input may be received from the user to define the fields from which data is to be extracted, and the template field information may be added to the document management configuration file. The user may be prompted, through the graphical user interface, to define a procedure to obtain one or more images of the user identification document, the procedure indicating whether to scan one or both sides of the user identification document. Input may be received from the user to define the procedure to obtain the at least one image of the customer identification document, and the image obtaining procedure may be added to the document management configuration file.

Some or all of the actions performed by the exemplary embodiments described herein can be performed under the control of a computer system executing computer-readable codes either in a computer-readable recording storage medium or in communication signals transmitted through a transmission medium. The computer-readable recording medium is any data storage device that can store data for a non-fleeting period of time such that the data can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transmission medium may include, for example, signals which modulate carrier waves transmitted through wired or wireless transmission paths.

It is to be understood that both the general description and the detailed description are exemplary and explanatory only and are not restrictive of the present invention, as claimed. Those skilled in the art will appreciate that the features described can be combined in various ways to form multiple variations of the invention. Other embodiments will be apparent to those skilled in the art from consideration of the specification and practice of the teachings disclosed herein. As a result, the invention is not limited to the specific examples described above, but only by the claims and their equivalents.

What is claimed is:

1. A method for managing an electronic document transaction, comprising:

communicating, by one or more of a document management application supporting one or more integration protocols and a document management module in communication with the document management application, with one or more of a user relationship management system, and a document management system using the one or more integration protocols;

receiving a request at one of a document management application and a document management module from the user relationship management system to execute the document management application comprising a previously-created document management process and implement the previously-created document management process;

displaying, on a graphical user interface at a host computer, an indication of a set of documents to be acquired from a plurality of documents identified in the previously-created document management process, the set of documents comprising at least one document comprising a digital signature;

communicating, by one or more of the document management application supporting one or more integration protocols and the document management module in communication with the document management application, with a signature acquisition module using the one or more integration protocols configured to acquire a digital signature from a signature input device to create a digitally-signed electronic document;

receiving the digitally-signed electronic document created with the digital signature from the signature acquisition module;

creating an association in the form of a transaction file between user identification information and the digitally-signed electronic document, wherein the transaction file represents a single file that is created for each user transaction, and wherein the transaction file includes a plurality of required documents for a user transaction with respect to at least one of the plurality of documents;

communicating, by one or more of the document management application supporting the one or more integration protocols and the document management module in communication with the document management application, with a scanning device using the one or more integration protocols, the scanning device configured to acquire one or more images of one of the set of documents to be acquired identified in the previously-created document management process, the previously-created document management process indicating an image acquisition procedure at the graphical user interface;

receiving the acquired one or more images of one of the set of documents;

adding the one or more acquired images to the transaction file;

comparing at least one of the received images of one of the set of documents to a document template to automatically identify the one indicated document, the document template being created in the previously-created document management process and defining dimensions, textual characteristics, and at least one characteristic image, the at least one characteristic image being a characteristic of the indicated document that differentiates the indicated document from other documents, the template including fields defined therein from data to be extracted;

communicating, through the document management application, with an optical character recognition (OCR) library and extracting data from the at least one received image corresponding to the defined fields within the document template using the OCR library;

adding the extracted data to the transaction file;

transmitting the transaction file to a database;

comparing the extracted data with one or more of corresponding data extracted from another of the set of documents and user data input at the graphical user interface;

determining whether a confidence level associated with the comparison of the extracted data with the one or more of corresponding data extracted from another of the set of documents and user data input at the graphical user interface is within a confidence interval, wherein the confidence interval is set based on detection rates associated with a document type of the one of the set of documents, wherein the detection rates depend on quality of the acquired one or more images of the one of the set of documents, and wherein the confidence interval is variably defined to indicate an acceptable difference between a plurality of sets of the extracted data that are compared with each other; and in response to a determination that the confidence level is within the confidence interval, generating an indication of a match between the extracted data with the one or more of corresponding data extracted from another of the set of documents and user data input at the graphical user interface.

2. The method of claim 1, further comprising:
reducing a size of the transaction file by compressing the one or more obtained images at one or more of the document management application and the document management module before transmitting the transaction file to the database.

3. The method of claim 1, the method further comprising:
creating the electronic document to receive the digital signature thereon from the extracted data; and
transmitting the created document to the signature acquisition module in communication with the signature input device to receive the digital signature, input at the signature input device, on the electronic document.

4. The method of claim 1, further comprising:
receiving a request from the host computer at a network node to execute the document management application at the network node including the previously-created document management process.

5. The method of claim 1, further comprising:
executing the document management application including the previously-created document management process on one or more of the host computer and a virtual image of the host computer provided from a portable storage memory device.

6. The method of claim 1, wherein the transaction file includes each document required for the user transaction represented by an action performed by a user with respect to at least one of the plurality of documents.

7. A non-transitory computer-readable medium comprising computer-readable instructions, which, when loaded and executed on a computer system, cause the computer system to perform operations according to a method, the method comprising:

communicating, by one or more of a document management application supporting one or more integration protocols and a document management module in communication with the document management application, with one or more of a user relationship management system, and a document management system using the one or more integration protocols;

receiving a request at one of a document management application and a document management module from the user relationship management system to execute the document management application comprising a previously-created document management process and implement the previously-created document management process;

displaying, on a graphical user interface at a host computer, an indication of a set of documents to be acquired from a plurality of documents identified in the previously-created document management process, the set of documents comprising at least one document comprising a digital signature;

communicating, by one or more of the document management application supporting one or more integration protocols and the document management module in communication with the document management application, with a signature acquisition module using the one or more integration protocols configured to acquire a digital signature from a signature input device to create a digitally-signed electronic document;

receiving the digitally-signed electronic document created with the digital signature from the signature acquisition module;

creating an association in the form of a transaction file between user identification information and the digitally-signed electronic document, wherein the transaction file represents a single file that is created for each user transaction, and wherein the transaction file includes a plurality of required documents for a user transaction with respect to at least one of the plurality of documents;

communicating, by one or more of the document management application supporting the one or more integration protocols and the document management module in communication with the document management application, with a scanning device using the one or more integration protocols, the scanning device configured to acquire one or more images of one of the set of documents to be acquired identified in the previously-created document management process, the previously-created document management process indicating an image acquisition procedure at the graphical user interface;

receiving the acquired one or more images of one of the set of documents;

adding the one or more acquired images to the transaction file;

comparing at least one of the received images of one of the set of documents to a document template to automatically identify the one indicated document, the document template being created in the previously-created document management process and defining dimensions, textual characteristics, and at least one characteristic image, the at least one characteristic image being a characteristic of the indicated document that differentiates the indicated document from other documents, the template including fields defined therein from data to be extracted;

communicating, through the document management application, with an optical character recognition (OCR) library and extracting data from the at least one received image corresponding to the defined fields within the document template using the OCR library;

adding the extracted data to the transaction file;

transmitting the transaction file to a database;

comparing the extracted data with one or more of corresponding data extracted from another of the set of documents and user data input at the graphical user interface;

determining whether a confidence level associated with the comparison of the extracted data with the one or more of corresponding data extracted from another of the set of documents and user data input at the graphical user interface is within a confidence interval, wherein the confidence interval is set based on detection rates associated with a document type of the one of the set of documents, wherein the detection rates depend on quality of the acquired one or more images of the one of the set of documents, and wherein the confidence interval is variably defined to indicate an acceptable difference between a plurality of sets of the extracted data that are compared with each other; and in response to a determination that the confidence level is within the confidence interval, generating an indication of a match between the extracted data with the one or more of corresponding data extracted from another of the set of documents and user data input at the graphical user interface.

8. The non-transitory computer-readable medium of claim 7, further comprising:

reducing a size of the transaction file by compressing the one or more obtained images at one or more of the document management application and the document management module before transmitting the transaction file to the database.

9. The non-transitory computer-readable medium of claim 7, the method further comprising:

creating the electronic document to receive the digital signature thereon from the extracted data; and transmitting the created document to the signature acquisition module in communication with the signature input device to receive the digital signature, input at the signature input device, on the electronic document.

10. The non-transitory computer-readable medium of claim 7, further comprising:

receiving a request from the host computer at a network node to execute the document management application at the network node including the previously-created document management process.

11. The non-transitory computer-readable medium of claim 7, further comprising:

executing the document management application including the previously-created document management process on one or more of the host computer and a virtual image of the host computer provided from a portable storage memory device.

12. The non-transitory computer-readable medium of claim 7, wherein the document management system comprises the database.

13. A document management system, comprising:

a network node;

a host computer communicating with the network node and including a graphical user interface configured to display an indication of a set of documents to be acquired from a plurality of documents identified in a previously-created document management process, the set of documents comprising at least one document comprising a digital signature;

a database in communication with the host computer;

an input device configured to receive a user signature used to create a digitally-signed electronic document, wherein a document management application supporting one or more integration protocols is executed at one or more of the host computer and the network node, the document management application comprising the previously-created document management process, execution of the document management application causing the indication of the set of documents to be acquired according to the previously-created document management process to be displayed at the graphical user interface at the host computer, and wherein one or more of the document management application and a document management module in communication with the document management application is configured to communicate with a signature acquisition module using the one or more integration protocols to acquire a digital signature from the input device, create a digitally-signed electronic document with the digital signature and receive the digitally-signed electronic document, create an association in the form of a transaction file between user identification information and the digitally-signed electronic document, and transmit the transaction file to the database to be stored therein, wherein the transaction file represents a single file that is created for each user transaction, and wherein the transaction file includes a plurality of required documents for a user transaction with respect to at least one of the plurality of documents; and a scanning device communicating, through one or more of the document management application supporting the one or more integration protocols and the document management module in communication with the document management application, with one or more of the host computer and the network node using the one or more integration protocols configured to obtain one or more images of one of the set of documents to be acquired identified in the previously-created document management process, the previously-created document management process indicating an image acquisition procedure at the graphical user interface, wherein data is extracted from the one or more obtained images corresponding to defined fields within a document template using an optical character recognition (OCR) library, wherein the extracted data is compared with one or more of corresponding data extracted from another of the set of documents and user data input at the graphical user interface, and wherein a determination is to be made as to whether a confidence level associated with the comparison of the extracted data with the one or more of corresponding data extracted from another of the set of documents and user data input at the graphical user interface is within a confidence interval, wherein the confidence interval is set based on detection rates associated with a document type of the one of the set of documents, wherein the detection rates depend on quality of the obtained one or more images of the one of the set of documents, and wherein the confidence interval is variably defined to indicate an acceptable difference between a plurality of sets of the extracted data that are compared with each other, and wherein, in response to a determination that the confidence level is within the confidence interval, an indication of a match between the extracted data with the one or more of corresponding data extracted from another of the set of documents and user data input is to be generated at the graphical user interface.

14. The system of claim 13, wherein one of more of the document management application supporting the one or more integration protocols and the document management module in communication with the document management application communicates with one or more of a user relationship management system, and an external document management system using the one or more integration protocols, the user relationship management system transmitting a request to one of the document management application and the document management module to execute the document management application comprising the previously-created document management process and implement the previously-created document management process.

* * * * *

UNITED STATES PATENT AND TRADEMARK OFFICE
CERTIFICATE OF CORRECTION

PATENT NO. : 10,140,294 B2
APPLICATION NO. : 13/485367
DATED : November 27, 2018
INVENTOR(S) : Marco Millefiorini et al.

Page 1 of 1

It is certified that error appears in the above-identified patent and that said Letters Patent is hereby corrected as shown below:

On the Title Page

At Item (30), Foreign Application Priority Data "12425054" should be "12425054.9".

Signed and Sealed this
Nineteenth Day of February, 2019

Andrei Iancu
*Director of the United States Patent and Trademark Office*